United States Patent [19]

Forbus et al.

[11] Patent Number: 5,144,082
[45] Date of Patent: Sep. 1, 1992

[54] ALKYLPHENOL LUBRICANTS FROM ALPHA-OLEFIN DIMER

[75] Inventors: Thomas R. Forbus, Newtown, Pa.; Bruce P. Pelrine, Trenton, N.J.

[73] Assignee: Mobil Oil Corporation, Fairfax, Va.

[21] Appl. No.: 686,459

[22] Filed: Apr. 17, 1991

Related U.S. Application Data

[62] Division of Ser. No. 312,277, Feb. 21, 1989, abandoned.

[51] Int. Cl.$^5$ .............................................. C07C 37/14
[52] U.S. Cl. .................................... 565/785; 568/789; 568/790; 568/794; 568/792
[58] Field of Search .................... 585/11, 24, 26; 564/409, 426, 427; 566/103, 106, 130; 570/182, 183; 568/308, 326, 327, 328, 335, 927, 929, 733, 734, 736, 763, 67, 58, 628, 632, 635, 789, 790, 794

[56] References Cited

U.S. PATENT DOCUMENTS

| | | | |
|---|---|---|---|
| 4,035,308 | 7/1977 | Schenach | 585/467 |
| 4,238,343 | 12/1980 | Pellegrini, Jr. | 585/24 |
| 4,604,491 | 8/1986 | Dressler et al. | 585/26 |

FOREIGN PATENT DOCUMENTS

| | | | |
|---|---|---|---|
| 168534 | 1/1986 | European Pat. Off. | 585/24 |
| 305114 | 3/1989 | European Pat. Off. | 585/26 |
| 806667 | 2/1981 | U.S.S.R. | 585/26 |

OTHER PUBLICATIONS

Bilmeyer, Jr. "Textbook of Polymer Science", 2nd Ed., 1973 (Wiley & Interscience) pp. 312–315.

*Primary Examiner*—Asok Pal
*Attorney, Agent, or Firm*—Alexander J. McKillop; Charles J. Speciale; Malcolm D. Keen

[57] ABSTRACT

It is disclosed that aromatic compounds can be alkylated with mono-olefinic HVI-PAO dimer in contact with an acidic catalyst to produce novel alkylated aromatic compositions. It has been found that the novel HVI-PAO dimer alkylated aromatic compositions exhibit an extraordinary combination of properties relating to low viscosity with high viscosity index and low pour point which renders them very useful as lubricant basestock. Further, it has been found that the novel alkylaromatic compositions of the present invention show improved oxidative stability. Depending upon the substituent groups on the aromatic nucleus, useful lubricant additives can be prepared for improved antiwear, antioxidant and other properties. HVI-PAO dimer is prepared as a product or by-product from 1-alkene oligomerization using reduced chromium oxide on solid support. Particularly disclosed are the alkylphenols prepared by the process of alkylation a phenol at the aromatic nucleus with the novel oligomer.

3 Claims, 1 Drawing Sheet

FIG
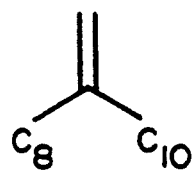
1
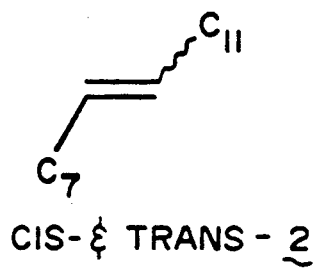
CIS- & TRANS- 2
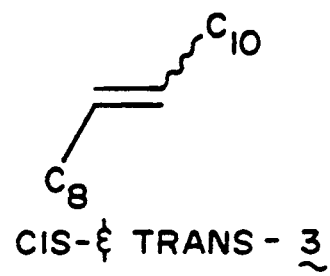
CIS- & TRANS- 3
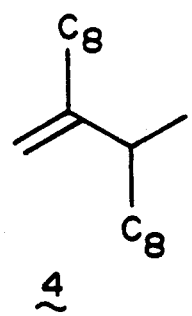
4
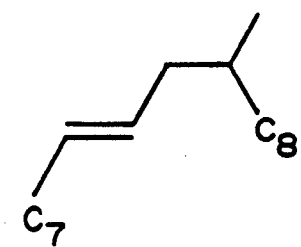
CIS- & TRANS- 5
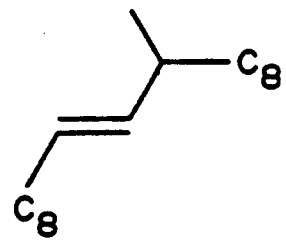
CIS- & TRANS- 6

ALKYLPHENOL LUBRICANTS FROM ALPHA-OLEFIN DIMER

This is a division of copending application Ser. No. 07/312,277, filed on Feb. 21, 1989.

This invention relates to novel alkylated aromatic compositions useful as lubricant basestock and lubricant additives and to their means of preparation. More particularly, the invention relates to novel lubricant compositions having high viscosity index (VI) and increased oxidative stability prepared by alkylating aromatics with mono-olefinic dimer prepared by polyalpha-olefin oligomerization using reduced chromium oxide catalyst on solid support.

BACKGROUND OF THE INVENTION

Recently, novel lubricant compositions (referred to herein as HVI-PAO) comprising polyalpha-olefins and methods for their preparation employing as catalyst reduced chromium on a silica support have been disclosed in U.S. patent application Ser. Nos. 210,434 and 210,435 filed Jun. 23, 1988, incorporated herein by reference. The process comprises contacting $C_6$-$C_{20}$ 1-alkene feedstock with reduced valence state chromium oxide catalyst on porous silica support under oligomerizing conditions in an oligomerization zone whereby high viscosity, high VI liquid hydrocarbon lubricant is produced having branch ratios less than 0.19 and pour point below $-15°$ C. Lubricants produced by the process cover the full range of lubricant viscosities and exhibit a remarkably high VI and low pour point even at high viscosity. The as-synthesized HVI-PAO oligomer has a preponderance of terminal olefinic unsaturation.

Efforts to improve upon the performance of natural mineral oil based lubricants by the synthesis of oligomeric hydrocarbon fluids have been the subject of important research and development in the petroleum industry for at least fifty years and have led to the relatively recent market introduction of a number of superior polyalpha-olefin (PAO) synthetic lubricants, primarily based on the oligomerization of alpha-olefins or 1-alkenes. In terms of lubricant property improvement, the thrust of the industrial research effort on synthetic lubricants has been toward fluids exhibiting useful viscosities over a wide range of temperature, i.e., improved viscosity index, while also showing lubricity, thermal and oxidative stability and pour point equal to or better than mineral oil. These new synthetic lubricants lower friction and hence increase mechanical efficiency across the full spectrum of mechanical loads from worm gears to steel gears and do so over a wider range of operating conditions than mineral oil lubricants. The recently discovered HVI-PAO lubricants show a measurable superiority over prior art PAO synthetic lubricants.

Notwithstanding their generally superior properties compared to mineral oil lubricants, PAO lubricants are often formulated with additives to enhance those properties for specific applications. The more commonly used additives include oxidation inhibitors, rust inhibitors, metal passivators, antiwear agents, extreme pressure additives, pour point depressants, detergent-dispersants, viscosity index (VI) improvers, foam inhibitors and the like. This aspect of the lubricant arts is specifically described in Kirk-Othmer "Encyclopedia of Chemical Technology", 3rd edition, Vol. 14, pp 477-526, incorporated herein by reference. Improvements in lubricant technology pursued by artisans in the field flow from both new additive development addressed to deficiencies in lubricant oligomers and new oligomer development for inherently better properties. Alkylated aromatics, particularly alkylated naphthalene, are known in the prior art as lubricant additives for their antiwear properties, thermal and oxidative stability as disclosed in U.S. Pat. Nos. 4,211,665, 4,238,343, 4,604,491 and 4,714,794. Antiwear properties of alkyl-naphthalene lubricating fluids are presented in Khimiya i Tekhnologiya Topliv i Masel, No. 8, pp. 28-29, August 1986 and show promise as base stocks for lubricants.

In the preparation of the novel HVI-PAO lubricant, alpha-olefin dimer containing olefinic unsaturation can be separated from the oligomerization reaction. The composition of the dimer mixture conforms to the unique specificity of the oligomerization reaction in that little double bond isomerization is found. Separation of the dimer, representing non-lube range molecular weight material, is necessitated to control product volatility and viscosity. However, as oligomerization conditions are changed to produce the lower viscosity products of lower average molecular weight important to the marketplace, the non-lube range dimer fraction by-product yield increases in proportion to that lowering in average molecular weight of the oligomerization product. In the synthesis of low average molecular weight oligomers substantial amounts of products stop at the dimer stage. Once so formed, they are inert to the further incorporation of olefin in the HVI-PAO oligomerization reaction. The increase in dimer by-product yield represents a substantial economic burden on the overall process to produce useful lower viscosity lubricant in the HVI-PAO process.

Accordingly, it is an object of the present invention to provide a process for the utilization of the HVI-PAO by-product dimer for the further production of novel synthetic lubricant fluid.

It is another object of the present invention to provide a process for the production of low viscosity lubricant exhibiting superior lubricant properties utilizing HVI-PAO mono-olefinic dimer for aromatics alkylation.

Yet another object of the instant invention is to provide novel alkylaromatic lubricant compositions that display superior lubricant properties derived from alpha-olefin dimers.

A further object of the present invention is to provide useful lubricant additives from aromatics alkylation by using alpha-olefin dimer as alkylating agent.

SUMMARY OF THE INVENTION

The discovery has been made that aromatic compounds can be alkylated with mono-olefinic HVI-PAO dimer in contact with an acidic catalyst to produce novel alkylated aromatic hydrocarbon compositions. It has been found that the novel HVI-PAO dimer alkylated aromatic hydrocarbons exhibit an extraordinary combination of properties relating to low viscosity with high viscosity index and low pour point which makes them very useful as lubricant basestock. Further, it has been found that the novel alkylaromatic compositions of the present invention show improved oxidative stability. Depending upon the substituent groups on the aromatic nucleus, useful lubricant additives can be prepared for improved antiwear properties, antioxidant and other properties.

More particularly, novel alkylated aromatic hydrocarbon compositions have been discovered having the structure

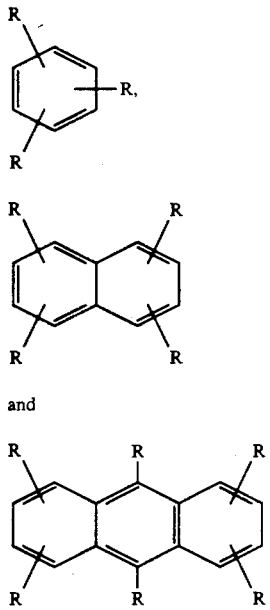

where at least one R group comprises an alkyl group, said alkyl group comprising the hydrocarbyl moiety of the olefinic dimer of $C_6$-$C_{20}$ 1-alkene, wherein dimer comprises a product or by-product of the oligomerization of $C_6$-$C_{20}$ 1-alkene under oligomerization conditions in contact with supported reduced metal oxide catalyst, said metal oxide catalyst comprising a lower valence state form of at least Group VIB metal; and wherein the remaining R groups are taken from the group consisting essentially of hydrogen, $C_1$-$C_{20}$ cyclic or acyclic alkyl and alkenyl, aryl, $NH_2$, acylamido, halogen, acyl, $NO_2$, YO and YS where Y is hydrogen, acyl, alkoxycarbonyl, phenyl and $C_1$-$C_{20}$ cyclic or acyclic alkyl and alkenyl.

It has been found that the novel alkylated aromatic hydrocarbons of the instant invention can be prepared by Friedel-Crafts reaction by contacting the HVI-PAO dimer and aromatic compound with acidic catalyst such as Lewis acids. Aluminum chloride or zeolite catalysts are suitable.

The process of the present invention for the preparation of alkylaromatic hydrocarbons suitable as liquid lubricant basestock or additive comprises:

contacting at least one alkylatable aromatic compound and $C_{12}$-$C_{40}$ mono-olefin in an alkylation zone with acidic alkylation catalyst under alkylation conditions, whereby alkylated aromatic liquid hydrocarbon is produced. The mono-olefin comprises a product or by-product of the oligomerization of $C_6$-$C_{20}$ 1-alkene under oligomerization conditions in contact with supported reduced metal oxide catalyst. The metal oxide catalyst comprising a lower valence state form of at least Group VIB metal. The alkylation reaction mixture is separated and alkylated aromatic liquid hydrocarbon recovered.

DESCRIPTION OF THE FIGURES

FIG. 1 illustrates the possible dimer structures from the oligomerization of 1-decene according to the HVI-PAO process.

DETAILED DESCRIPTION OF THE INVENTION

In the preferred embodiments of the present invention synthetic hydrocarbon lubricants are prepared by alkylation of aromatics using unique mono-olefin dimers produced as by-product in the HVI-PAO oligomerization reaction as alkylating agent. The alkylate produced as synthetic hydrocarbon lubricant has a typically low viscosity and high viscosity index. When alpha-olefin, such as 1-decene, is oligomerized in the HVI-PAO process products with very high viscosity indices and low pour points are obtained. Retention of the low pour point properties of these oligomers upon hydrogenation, a necessary process to impart good oxidative stability to the products, requires removal of the dimers to very low levels. In the synthesis of low viscosity fluids by the HVI-PAO process a substantial amount of the 1-decene is dimer. This limits the yield of lube range product and gives a substantial amount of by-product. The dimers are separated from the oligomerization reaction product typically by distillation inorder to meet lube specifications such as volatility, viscosity and pour point.

The HVI-PAO process consists of the oligomerization of 1-alkenes in contact with reduced chromium oxide on silica support. A characteristic of the novel oligomerization reaction from which the by-product dimers used in the present invention are produced is the production of mixtures of dialkyl vinylidenic and 1,2 dialkyl or trialkyl mono-olefin oligomers, or HVI-PAO oligomers, as determined by infra-red and NMR analysis. However, in general, the HVI-PAO oligomers have the following regular head-to-tail structure where n is preferably 0 to 17, terminating in olefinic unsaturation:

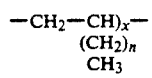

with some head-to-head connections.

The HVI-PAO process produces a surprisingly simpler and useful dimer compared to the dimer produced by 1-alkene oligomerization with $BF_3$ or $AlCl_3$ as commercially practiced. Typically, in the present invention it has been found that a significant proportion of unhydrogenated dimerized 1-alkene, or alpha-olefin, has a vinylidenyl structure as follows:

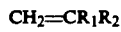

where $R_1$ and $R_2$ are alkyl groups representing the residue from the head-to-tail addition of 1-alkene molecules. For example, the by-product dimer from 1-decene oligomerization according to the HVI-PAO process, which can be used as the mono-olefin feedstock in the present invention, has been found to contain three major components, as determined by GC. Based on $C$-13 NMR analysis, the unhydrogenated components were found to be 8-eicosene, 9-eicosene, 2-octyldodecene and 9-methyl-8 or 9-methyl-9-nonadecene.

The dimers that are obtainable from 1-decene oligomerization, for example, by the HVI-PAO process are four general structural isomers in which two internal olefin products have a pair of double bond positional isomers plus cis/trans configurations. This gives ten possible dimer structures from 1-decene which are shown in FIG. 1. From analysis of the product mixture of hydrogenated dimer, structures 1, 2 and 3, shown in FIG. 1, are the major dimer products produced from 1-decene oligomerization with the HVI-PAO process.

Aromatic compounds which may be used in the present invention include substituted and unsubstituted benzene and polynuclear aromatic compounds, particularly naphthalene and anthracene. Such aromatic compounds have the structure:

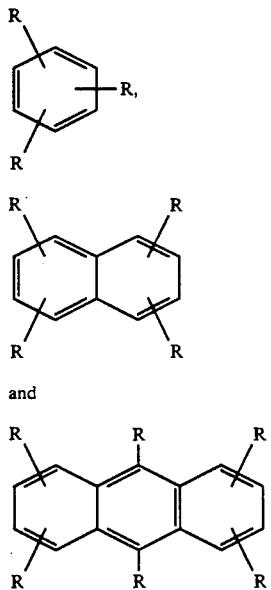

and where at least one R group comprises an alkyl group, said alkyl group comprising the hydrocarbyl moiety of the olefinic dimer of $C_6$–$C_{20}$ 1-alkene, wherein the dimer comprises a product or by-product of the oligomerization of $C_6$–$C_{20}$ 1-alkene under oligomerization conditions in contact with supported reduced metal oxide catalyst, said metal oxide catalyst comprising a lower valence state form of at least Group VIB metal; and wherein the remaining R groups are taken from the group consisting essentially of hydrogen, $C_1$–$C_{20}$ cyclic or acyclic alkyl and alkenyl, aryl, $NH_2$, acylamido, halogen, acyl, $NO_2$, YO and YS where Y is hydrogen, acyl, alkoxycarbonyl, phenyl and $C_1$–$C_{20}$ cyclic or acyclic alkyl and alkenyl. Useful aromatic hydrocarbons for the present invention include benzene, toluene, o,m,p-xylene, hemimellitene, pseudocumene, ethylbenzene, n-propylbenzene, cumene, n-butylbenzene, isobutylbenzene, sec-butylbenzene, tertbutylbenzene, p-cymene, biphenyl, diphenylmethane, triphenyl methane, 1,2-diphenylethane and similarly alkyl substituted naphthalenes and anthracenes; also derivatives of aromayic hydrocarbons including phenol, hindered phenols such as 2,6-dimethyl phenol, catechol, acylphenol such as acetylphenol, carbonate esters such as phenyl methyl or ethyl carbonate and diphenyl carbonate, alkylphenol such as anisole, chloro and bromobenzene, aniline, acyl aniline such as acetanilide, methyl and ethylbenzoate, thiophenol and acylated thiophenol, nitrobenzene, diphenylether, diphenylsulfide and similarly substituted naphthalenes and anthracenes, in particular naphthols such as mono and dihydroxy naphthalene.

Generally, the hydrocarbyl HVI-PAO dimer moiety referred to above comprises a vinylidenyl radical having the structure:

$R_1R_2CH$—$CH_2$— where $R_1$ and $R_2$ are alkyl groups, alike or different. The hydrocarbyl HVI-PAO dimer moiety may contain between 12 and 40 carbon atoms; but preferably about 20 carbon atoms.

The HVI-PAO dimer alkylaromatic derivatives of the present invention are prepared in a Friedel-Crafts acid catalyzed alkylation synthesis. Acids which may be used as catalyst include Lewis acids such as, but not limited to, $BF_3$ and complexes of $BF_3$ with oxygenates such as ethers, esters, alcohols; and $AlCl_3$, HCl, HF, HBr, $H_2SO_4$, $H_3PO_4$, $P_2O_5$, $SO_3$, $SnCl_4$, $FeCl_3$, $ZnCl_2$, $TiCl_4$, $SbCl_5$, large and medium pore acidic zeolites such as H-ZSM-5, H-ZSM-11, H-ZSM-12 and acidic Y zeolite; and organic acids such as R—$SO_3H$ where R is a polymeric resin such as sulfonated polystyrene. Preferred catalysts are $AlCl_3$, $BF_3$ and its complexes, acidic zeolites and Amberlyst 15, obtainable from Rohm & Haas.

In the preparation of HVI-PAO dimers, olefins suitable for use as starting material in the preparation of olefinic HVI-PAO oligomers and the by-product dimer used as starting material in the present invention include those olefins containing from 6 to about 20 carbon atoms such as 1-hexene, 1-octene, 1-decene, 1-dodecene and 1-tetradecene and branched chain isomers such as 4-methyl-1-pentene. A preferred 1-alkene is 1-decene. Also suitable for use are olefin-containing refinery feedstocks or effluents. Unsaturated HVI-PAO alpha-olefin oligomers are prepared by oligomerization reactions in which a major proportion of the double bonds of the alpha-olefins are not isomerized. These reactions include alpha-olefin oligomerization by supported metal oxide catalysts, such as Cr compounds on silica or other supported IUPAC Periodic Table Group VIB compounds. The catalyst most preferred is a lower valence Group VIB metal oxide on an inert support. Preferred supports include silica, alumina, titania, silica alumina, magnesia and the like. The support material binds the metal oxide catalyst. Those porous substrates having a pore opening of at least 40 angstroms are preferred.

The supported metal oxide catalysts are preferably prepared by impregnating metal salts in water or organic solvents onto the support. Any suitable organic solvent known to the art may be used, for example, ethanol, methanol, or acetic acid. The solid catalyst precursor is then dried and calcined at 200° to 900° C. by air or other oxygen-containing gas. Thereafter the catalyst is reduced by any of several various and well known reducing agents such as, for example, CO, $H_2$, $NH_3$, $H_2S$, $CS_2$, $CH_3SCH_3$, $CH_3SSCH_3$, metal alkyl containing compounds such as $R_3Al$, $R_3B$,$R_2Mg$, RLi, $R_2Zn$, where R is alkyl, alkoxy, aryl and the like. Preferred are CO or $H_2$ or metal alkyl containing compounds. Alternatively, the Group VIB metal may be applied to the substrate in reduced form, such as CrII compounds. The resultant catalyst is very active for oligomerizing olefins at a temperature range from below room temperature to about 250° C. at a pressure of 0.1 atmosphere to 5000 psi. However, oligomerization temperature is preferably between 90°–250° C. at a feedstock to catalyst weight ratio between 10:1 and 30:1. Contact time of both the olefin and the catalyst can vary from one second to 24 hours. The catalyst can be used in a batch type reactor or in a fixed bed, continuous-flow reactor.

In general the support material may be added to a solution of the metal compounds, e.g., acetates or nitrates, etc., and the mixture is then mixed and dried at room temperature. The dry solid gel is purged at successively higher temperatures to about 600° for a period of about 16 to 20 hours. Thereafter the catalyst is cooled down under an inert atmosphere to a temperature of about 250° to 450° C. and a stream of pure reducing agent is contacted therewith for a period when enough CO has passed through to reduce the catalyst as indicated by a distinct color change from bright orange to pale blue. Typically, the catalyst is treated with an amount of CO equivalent to a two-fold stoichiometric excess to reduce the catalyst to a lower valence CrII state. Finally the catalyst is cooled down to room temperature and is ready for use.

The product oligomers have a very wide range of viscosities with high viscosity indices suitable for high performance lubrication use. The product oligomers also have atactic molecular structure of mostly uniform head-to-tail connections with some head-to-head type connections in the structure. These low branch ratio oligomers have high viscosity indices at least about 15 to 20 units and typically 30–40 units higher than equivalent viscosity prior art oligomers, which regularly have higher branch ratios and correspondingly lower viscosity indices. These low branch oligomers maintain better or comparable pour points.

The branch ratios defined as the ratios of $CH_3$ groups to $CH_2$ groups in the reaction products and by-products are calculated from the weight fractions of methyl groups obtained by infrared methods, published in *Analytical Chemistry*, Vol. 25, No. 10, p. 1466 (1953).

$$\text{Branch ratio} = \frac{\text{wt fraction of methyl group}}{1 - (\text{wt fraction of methyl group})}$$

The following examples are presented to illustrate the oligomerization reaction and lubricant grade oligomers produced therefrom. The reaction provides as a by-product the olefinic dimer used as alkylating agent in the present invention. The dimer is separated by distillation from the oligomerization reaction mixture.

EXAMPLE 1

Catalyst Preparation and Activation Procedure 1.9 grams of chromium (II) acetate $(Cr_2(OCOCH_3)_4 2H_2O)$ (5.58 mmole) (commercially obtained) is dissolved in 50 cc of hot acetic acid. Then 50 grams of a silica gel of 8–12 mesh size, a surface area of 300 $m^2/g$, and a pore volume of 1 cc/g, also is added. Most of the solution is absorbed by the silica gel. The final mixture is mixed for half an hour on a rotavap at room temperature and dried in an open-dish at room temperature. First, the dry solid (20 g) is purged with $N_2$ at 250° C. in a tube furnace. The furnace temperature is then raised to 400° C. for 2 hours. The temperature is then set at 600° C. with dry air purging for 16 hours. At this time the catalyst is cooled down under $N_2$ to a temperature of 300° C. Then a stream of pure CO (99.99% from Matheson) is introduced for one hour. Finally, the catalyst is cooled down to room temperature under $N_2$ and ready for use.

EXAMPLE 2

The catalyst prepared in Example 1 (3.2 g) is packed in a ⅜" stainless steel tubular reactor inside an $N_2$ blanketed dry box. The reactor under $N_2$ atmosphere is then heated to 150° C. by a single-zone Lindberg furnace. Pre-purified 1-hexene is pumped into the reactor at 140 psi and 20 cc/hr. The liquid effluent is collected and stripped of the unreacted starting material and the low boiling material at 0.05 mm Hg. The residual clear, colorless liquid has viscosities and VI's suitable as a lubricant base stock.

| Sample | Prerun | 1 | 2 | 3 |
|---|---|---|---|---|
| T.O.S., hr. | 2 | 3.5 | 5.5 | 21.5 |
| Lube Yield, wt % | 10 | 41 | 74 | 31 |
| Viscosity, cS, at | | | | |
| 40° C. | 208.5 | 123.3 | 104.4 | 166.2 |
| 100° C. | 26.1 | 17.1 | 14.5 | 20.4 |
| VI | 159 | 151 | 142 | 143 |

EXAMPLE 3

A commercial chrome/silica catalyst which contains 1% Cr on a large-pore volume synthetic silica gel is used. The catalyst is first calcined with air at 800° C. for 16 hours and reduced with CO at 300° C. for 1.5 hours. Then 3.5 g of the catalyst is packed into a tubular reactor and heated to 100° C. under the $N_2$ atmosphere. 1-Hexane is pumped through at 28 cc per hour at 1 atmosphere. The products are collected and analyzed as follows:

| Sample | C | D | E | F |
|---|---|---|---|---|
| T.O.S., hrs. | 3.5 | 4.5 | 6.5 | 22.5 |
| Lube Yield, % | 73 | 64 | 59 | 21 |
| Viscosity, cS, at | | | | |
| 40° C. | 2548 | 2429 | 3315 | 9031 |
| 100° C. | 102 | 151 | 197 | 437 |
| VI | 108 | 164 | 174 | 199 |

The process and products of the present invention employing HVI-PAO dimer as alkylating agent for aromatic compounds are described in the following Examples. The monoolefin dimers are readily attached to aromatic, alkylatable compounds by acid catalysis to produce low-to-moderate viscosity, high VI alkylaromatic lubricant basestocks. The alkylation reaction may be carried out in solution in the presence of a solvent or neat using liquid, solid or gaseous catalyst. The catalyst may also be in suspension in a stirred reactor or as a fluidized or fixed catalyst bed. The reaction conditions include temperature between −50° and 250° C. and pressure between 0.01 and 6895 kPa to produce alkylated aromatic liquid hydrocarbon with a viscosity of at least 2cS at 100° C. and viscosity index greater than 50, also measured at 100° C.

EXAMPLE 4

The $C_{20}$ dimer olefins produced from the oligomerization of 1-decene according to the HVI-PAO process are reacted at reflux with toluene (1:1 molar ratio) using aluminum chloride as catalyst (1–2% by weight) until conversion to alkylaromatic is constant as determined by GC. The catalyst is removed and the unreacted material distilled leaving the alkylaromatic fluid.

EXAMPLE 5

The procedure of Example 4 is followed except that 4% by weight strong acid cation exchange resin (Amberlyst XN-1010, Rohm and Haas) is used as catalyst and the temperature is maintained at 110° C.

EXAMPLE 6

The procedure of Example 4 is followed except that 1% by weight of trifluoromethanesulfonic acid is used as catalyst and the temperature is maintained at 75° C. The yield is 86% of 750° F. fluid.

EXAMPLE 7

The procedure of Example 4 is followed except that naphthalene is used as aromatic rather than toluene.

EXAMPLE 8

The procedure of Example 5 is followed except that naphthalene is used rather than toluene.

The results of Examples 4–8 are presented in Table 1.

TABLE 1

| Fluid | CS @40° C. | CS @100° C. | VI | Pour Pt. °C. |
|---|---|---|---|---|
| Example 4 | 29.91 | 5.30 | 110 | −27 |
| Example 5 | 26.85 | 5.29 | 133 | −26 |
| Example 6 | 28.05 | 5.17 | 114 | −32 |
| Example 7 | 114.5 | 12.68 | 103 | |
| Example 8 | 48.92 | 6.90 | 95 | |

In the following Example 9, the alkylation of naphthalene using HVI-PAO 1-decene dimer is presented. The process is carried out in a fixed bed reactor using a Y-type zeolite in the acid form which was extruded with 35 wt % silica.

EXAMPLE 9

The feed consists of a 5:1 molar ratio (210 grams of naphthalenes and 91 grams of decene dimers). 5.6 moles (440 grams) of benzene is added to the feed to solubilize the naphthalene. At a reaction temperature of 250° C. about 90% of the decene dimer is used for the alkylation. Table 2 shows the experimental conditions and the conversion of naphthalene as determined by GC for three experiments A,B,C. Also shown in Table 2 are the viscometrics of the recovered alkylated naphthalene. The conversion of the naphthalene is affected by reaction temperature and is increased as the reaction temperature is raised.

TABLE 2

| | Experiment | | |
|---|---|---|---|
| | A | B | C |
| Reaction Temp, °C. | 159 | 200 | 250 |
| Pressure, psig | 400 | 400 | 400 |
| LHSV | 0.9 | 0.5 | 0.5 |
| Naphthalene Conv., % | 20.3 | 26.6 | 39.2 |
| Viscometrics of Alkyl Naphthalene | | | |
| KV, @40° C. | | 44.77 cS | |
| KV, @100° C. | | 6.22 cS | |
| VI | | 79.5 | |

In general, alkylaromatic lubricant basestocks are produced from 1-olefins with aromatics. The prior art products, as shown below in Table 3, have lower VI than the products of the present invention.

TABLE 3

| Basestock | CS @40° C. | CS @100° C. | VI | Pour Pt. °C. |
|---|---|---|---|---|
| ECA5381 | 14.35 | 2.94 | 20 | <−50 |
| ECA6482 | 96.68 | 8.00 | 8 | −33 |
| Alkyltoluene from HVI-PAO Dimer | 29.94 | 5.30 | 110 | −27 |

The process for the alkylation of phenols with HVI-PAO dimer according to the present invention and the products produced represent a particularly novel and useful discovery. It has been discovered that alkylphenols can be prepared in near quantitative yields from phenol or hindered phenols such as 2,6-ditertiarybutyl phenol by alkylation with $C_{20}$ HVI-PAO olefins by acid catalysis. The preferred acid for the catalysis is trifluoromethanesulfonic acid. Amberlyst XN-1010 (obtainable from Rohm and Haas), a strong acid cation-exchange resin, or Lewis acids such as aluminum chloride also work but give lower yields.

These alkylphenols find use as lubricant basestock and lubricant additives and precursors to more highly functionalized lubricant additives.

Alkylated phenol derivatives of the present invention have many beneficial uses as lubricant additives both as-is and when further functionalized. The functions of alkylphenols and their further derivatized products include:

1. Antioxidant as neat phenols or when reacted with 1-naphthyl amine to give N-arylnaphthylamines.
2. Antiwear as phenol phosphates.
3. Detergent as phenol sulfides.
4. Antiwear, anticorrosion and antioxidant as metal dialkyldithiophosphates.
5. Detergent and antioxidant as metal alkylsalicylates.
6. Detergent and dispersant as alkylhydroxybenzyl-polyamines.

In all cases additives used for these functions are either an alkylphenol or are synthesized from an alkylphenol. Generally the alkyl group of the phenol serves the important function of increasing the oil solubility of the phenol or its derivative. Long alkyl chains are in general preferable for good oil solubility. Twenty carbon olefins produced from dimerization of 1-decene are highly reactive towards phenol(s) under conditions of acid catalysis and can serve as good intermediates to numerous lubricant additives.

Typically in the prior art alkylphenols derived from isobutylene oligomers are used as the precursors to the above mentioned additives based upon alkylphenols. Although such additives based upon isobutylene oligomers are relatively inexpensive, in some applications they have stability problems. The alkylphenol disclosed here can have similar performance features without the instabilities associated with the isobutylene-derived alkyl groups. In addition, these alkylphenols are of sufficiently low viscosity to be effective as alkylaromatic-type basestocks for lubricant product formulations.

The alkylphenols are prepared by mixing at 25° C. equal molar amounts of the phenol and olefin and then adding 1–2% by weight trifluoromethanesulfonic acid with vigorous stirring. The acid is removed by conventional means to give the alkylphenols in 90% yield or greater. Other acid catalyst may be used such as strong acid cation-exchange resins or strong Bronsted or Lewis acids, however, trifluoromethanesulfonic acid gives the best results.

EXAMPLE 10

Equal molar amounts of phenol and $C_{20}$ HVI-PAO dimer olefin of 1-decene prepared as described herein are mixed and then 1.4% by weight trifluoromethanesulfonic acid is added to the vigorously stirred mixture. After 1 hr. the acid is removed by water washing and the small amount of unreacted starting materials is removed by distillation. The yield of para-substituted $C_{20}$ alkylphenols is 94%. The product mixture has a kinematic viscosity of 10.36 cS at 100° C. and a VI of 4.

EXAMPLE 11

Eqaual molar amounts of 2,6-di-tert-butylphenol and $C_{20}$ olefin of 1-decene prepared as described herein are mixed and then 1.6% by weight trifluoromethanesulfonic acid is added to the vigorously stirred mixture. After 1 hr. the acid is removed by water washing and the small amount of unreacted starting materials is removed by distillation. The yield of the $C_{20}$ alkylphenol is 90%. The liquid product has a kinematic viscosity of 7.79 cs at 100 ° C. and a VI of 51.

Mono-alkylated hindered phenols can also be preapred by alkylating a 2,6-ditertiarybutyl phenol with by-product dimer derived from the synthesis of HVI-PAO by oligomerization of 1-decene over a chromium on silica catalyst. The alkylation is catalyzed by a hydrogen Y zeolite bound with silica. Because of the shape-selective nature of the zeolite, only a mono-alkylated product is formed.

EXAMPLE 12

The mono-alkylation process is carried out using a fixed-bed reactor. The hydrogen Y zeolite is bound with 35 weight % silica. The feed is comprised of 1:1 molar ratio (103 grams of 2,6 -ditertiarybutyl phenol and 140 grams of 1-decene dimers prepared as described herein).

The reactor pressure is maintained at 200 psig. The liquid hourly space velocity is varied between 1.2 and 0.6. The process was conducted using three reaction temperatures: 100°, 157° and 222° C.

At the various reaction temperatures, the yields of mono-alkylated phenol, according to gas chromatographic analysis are, 4.4, 6.6 and 11.0% respectively. These yields are on a "once-through" basis and may be increased by recycle of the reactants.

Table 4 shows some of the characterization of the mono-alkylated phenol with respect to elemental analysis and molecular weight determinations, consistent with mono-alkylation of phenol by dimer.

TABLE 4

Example 12 Hindered Phenol Characterization for $C_{34}H_{62}O$

|  | Calculated | Found |
|---|---|---|
| Elemental Analysis | | |
| Carbon | 83.95 | 84.09 |
| Hydrogen | 12.76 | 12.60 |
| Oxygen | 3.29 | 2.76 |
|  | 100.0 | 99.45 |
| Molecular Weight | | |
|  | 486 | 450 |

Any alkylatable phenol, including polynuclear phenols, may be used in the present invention for alkylation with olefinic dimer of alpha olefins described herein. Particularly useful phenols include phenol itself, 2,6-dimethyl phenol, 2,6-ditertiarybutyl phenol, 2-chlorophenol, 4-chlorophenol, 2,6 and 2,4-dichlorophenol, 2 and 4-acetamidophenol, 2 and 4-carboalkoxy phenol, 2 and 4-nitrophenol and 2 and 4-methoxyphenol.

The use of the novel alkylated or functionalized compositions of the present invention as lubrication fluids and additives in either a mineral or synthetic lubricant is unique and provides unprecedented performance benefit due to the inherent internal synergism. The process of enhancement of lubricating properties by addition of these compositions to either mineral or synthetic lubricants is surprising. For example, the process of improving wear, friction, corrosion inhibition, thermal and/or oxidative stability of a high temperature, high viscosity olefin oligomer via the addition of 0.1-100% of an alkylation product of the present invention and chromium-catalyzed polyalpha-olefin is uniqaue and not manifested in prior art. Additionally, the combination of lubricant formulations containing the above compositions with any of the following supplemental additives: dispersants, detergents, viscosity index improvers, extreme pressure/antiwear additives, antioxidants, pour depressants, emulsifiers, demulsifiers, corrosion inhibitors, antirust inhibitors, antistaining additives, friction modifiers, and the like are novel.

Although the present invention has been described with preferred embodiments and examples, it is to be understood that modifications and variations may be resorted to without departing from the spirit and scope of this invention, as those skilled in the art will readily understand. Such modifications and variations are considered to be within the purview and scope of the appended claims.

What is claimed is:

1. Aklylphenol compositions useful as lubricants or additives comprising the alkylation product of at least one alkylatable phenol compound and a mono-olefinic $C_{12}-C_{40}$ hydrocarbon in contact with an acidic alkylation catalyst, said olefin having the structure $R_1R_2CH=CH_2$, where $R_1$ and $R_2$ are alkyl groups which may be the same or different, the olefin comprising a product or by-product of the oligomerization of a $C_6-C_{20}$ 1-alkene under oligomerization conditions in contact with supported reduced metal oxide catalyst, said metal oxide catalyst comprising a lower valence state form of at least Group VIB metal.

2. The compositions of claim 1 wherein said alkylatable phenol is taken from the group consisting essentially of phenol, 2,6-dimethyl phenol, 2,6-ditertiarybutyl phenol, 2-chlorophenol, 4-chlorophenol, 2,6 and 2,4-dichlorophenol, 2 and 4-acetamidophenol, 2 and 4-carboalkoxy phenol, 2 and 4-nitrophenol and 2 and 4-methoxyphenol.

3. Compounds having the formula $C_{34}H_{62}O$, comprising the alkylation product of 2,6-ditertiarybutyl phenol and $C_{20}$ olefin in contact with acidic catalyst, said olefin having the structure $R_1R_2CH=CH_2$, where $R_1$ and $R_2$ are alkyl groups which may be the same or different, the olefin comprising dimer product or by-product of the oligomerization of 1-decene under oligomerization conditions in contact with supported reduced metal oxide catalyst, said meteal oxide catalyst comprising a lower valence state form of at least Group VIB metal.

* * * * *